(12) United States Patent
Shibata

(10) Patent No.: US 10,110,782 B2
(45) Date of Patent: Oct. 23, 2018

(54) PRINT COLOR MANAGING APPARATUS, CHART UTILIZATION CONTROL METHOD, AND NON-TRANSITORY COMPUTER-READABLE STORAGE MEDIUM STORING CHART UTILIZATION CONTROL PROGRAM

(71) Applicant: KONICA MINOLTA, INC., Chiyoda-ku, Tokyo (JP)

(72) Inventor: Kuniyasu Shibata, Kawasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 244 days.

(21) Appl. No.: 15/092,208

(22) Filed: Apr. 6, 2016

(65) Prior Publication Data
US 2016/0301830 A1   Oct. 13, 2016

(30) Foreign Application Priority Data
Apr. 13, 2015   (JP) .................................. 2015-081561

(51) Int. Cl.
*H04N 1/60* (2006.01)
*H04N 1/00* (2006.01)

(52) U.S. Cl.
CPC ....... *H04N 1/6036* (2013.01); *H04N 1/00244* (2013.01); *H04N 1/00323* (2013.01); *H04N 1/00347* (2013.01); *H04N 1/603* (2013.01); *H04N 1/6008* (2013.01); *H04N 1/6025* (2013.01); *H04N 1/6038* (2013.01); *H04N 1/6041* (2013.01); *H04N 2201/0094* (2013.01)

(58) Field of Classification Search
None
See application file for complete search history.

(56) References Cited

U.S. PATENT DOCUMENTS

2010/0067025 A1   3/2010   Agehama

FOREIGN PATENT DOCUMENTS

JP   2010074229 A   4/2010

*Primary Examiner* — John R Wallace
(74) *Attorney, Agent, or Firm* — Holtz, Holtz & Volek PC

(57) ABSTRACT

A print color management apparatus includes a table control section that creates a first table; a registering section that causes each image forming apparatus to register a specific print color assigned to itself and a name of the specific print color; and a chart data creating section that creates print data of a chart. In the print data, color values are specified for color patches for print color management and color name is specified for a first specific patch on the basis of the first table. The print color management apparatus further includes a chart judging section that obtains measured color data of a chart printed, and judges, on the basis of the measured color data, whether the measured chart is usable for print color management of a designated image forming apparatus; and a print color management section that performs the print color management according to the judgement result.

18 Claims, 8 Drawing Sheets

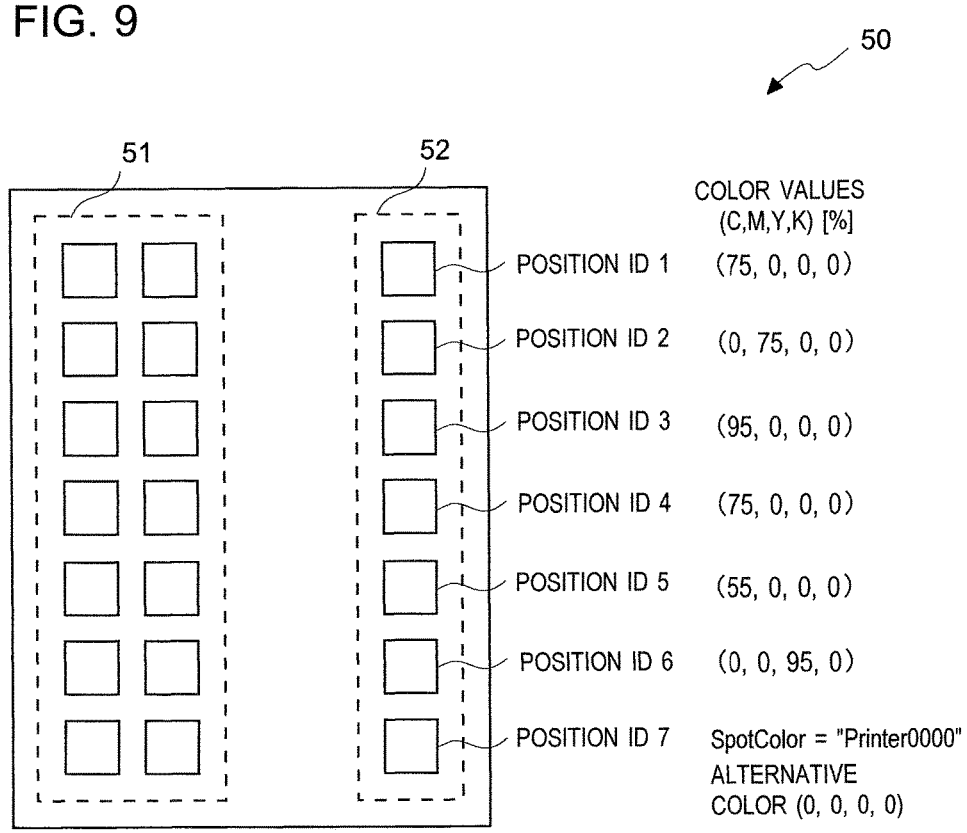

PRINT COLOR MANAGING APPARATUS, CHART UTILIZATION CONTROL METHOD, AND NON-TRANSITORY COMPUTER-READABLE STORAGE MEDIUM STORING CHART UTILIZATION CONTROL PROGRAM

The entire disclosure of Japanese Patent Application No. 2015-081561 filed on Apr. 13, 2015 including description, claims, drawings, and abstract are incorporated herein by reference in its entirety.

TECHNICAL FIELD

The present invention relates to a print color managing apparatus, a chart utilization control method, and a non-transitory computer-readable storage medium storing a chart utilization control program. In particular, the present invention relates to a print color managing apparatus which manages print colors by using a chart printed by an image forming apparatus, a chart utilization control method in a system including the print color managing apparatus, and a non-transitory computer-readable storage medium storing a chart utilization control program.

BACKGROUND

Color verification, verifying the condition of color reproduction of printed matters, is conducted by causing an image forming apparatus to print a chart in which color patches are arrayed and causing a color measurement device to read the chart. For example, an image forming apparatus outputs a chart without performing color management (color space conversion), a color measurement device measures colors of the chart, and a printer profile is created by using data of the measured colors. After the color management by using the created printer profile, the image forming apparatus outputs a chart, the color measurement device measures colors of the chart and color verification is performed by using the data of the measured colors. If a verification result indicates unacceptable color reproduction accuracy, color calibration is conducted on the color image forming apparatus by using its color calibration function, and the color image forming apparatus outputs a color chart again. Then, until a verification result indicating acceptable color reproduction accuracy is obtained, output of a color chart, color measurement, and color calibration are conducted repeatedly.

DESCRIPTION OF THE RELATED ART

With regard to printing of a chart used in such color verification, for example, Japanese Unexamined Patent Publication No. 2010-074229 (corresponding to US2010/0067025A1) discloses an image forming apparatus which includes a generation unit, a combining unit and an image output unit. On the basis of identification information for identifying a gradation characteristic measurement sheet to be used for measuring the gradation characteristic of the apparatus, the generation unit generates data of identification information measurement regions which includes an array of regions to be measured. The combining unit combines the data of identification information measurement regions generated by the generating unit and data of gradation characteristic measurement regions to be used for measuring the gradation characteristic. The image output unit outputs a gradation characteristic measurement sheet to be used for measuring the gradation characteristic, on the basis of the image data given by the combining unit.

In a system employing the above-mentioned color verification, reading a chart printed by an image forming apparatus as a color verification target and giving feedback to the image forming apparatus can realize appropriate verification of the condition of color reproduction of printed matters output by the image forming apparatus. However, in a system including plural image forming apparatuses, since the chart does not contain information to identify an image forming apparatus which printed the chart, a chart printed by another image forming apparatus, which is not a color verification target, can be inappropriately used for color verification. With such a chart, appropriate color verification is hardly conducted.

Further, the conditions of an image forming apparatus (for example, the condition of toner) tends to change over time. Accordingly, prompt reading chart printed by an image forming apparatus and giving feedback to the image forming apparatus can realize appropriate verification of the condition of color reproduction of printed matters output by the image forming apparatus. However, the chart does not contain information to identify when the chart was printed, and therefore an inappropriate chart, which was printed in the past, can be used for color verification. With such a chart printed in the past, appropriate color verification is hardly conducted.

To avoid such inappropriate use of a chart, the following method may be considered. The method includes combining identification information like a QR Code (a registered trademark of DENSO WAVE INCORPORATED) with a chart, printing the resulting chart, and reading the identification information in the printed chart with a camera. However, this method needs an operator to operate a camera to read the identification information additionally to operate a color measurement device to read the chart, and makes the operator's operations complicated.

Further, the method as disclosed in JP-A No. 2010-074229 may be considered. The method includes creating a color patch of identification information, such as a serial ID and information of date, and printing a chart combined with the color patch of identification information, on the side of the image forming apparatus, and reading the color patch in the printed chart with a color measurement device. However, this method needs development of a technique to create a color patch of the identification information and combine the color patch with the chart by using an image forming apparatus, and especially in a system including image forming apparatuses provided by various vendors, needs development of such a technique for each vendor. Consequently, a problem arises in that development cost increases.

SUMMARY

Aspects of the present invention are directed to print color managing apparatuses, chart utilization control methods, and non-transitory computer-readable storage media each storing a chart utilization control program, which can avoid an inappropriate use of a chart securely by a simple and easy technique.

A print color managing apparatus reflecting one aspect of the present invention is a print color managing apparatus which is communicably connected to a plurality of image forming apparatuses and a color measurement device, where the plurality of image forming apparatuses each includes a color converter which accepts a color name specified as a print color. The print color management apparatus comprises a table control section that creates a first table in which identification information of each of the plurality of image forming apparatuses, a specific print color assigned to the each of the plurality of image forming apparatuses, and a name of the specific print color are associated with each other. The print color management apparatus further comprises a registering section that causes each of the plurality of image forming apparatuses to register the specific print color assigned to the each of plurality of image forming apparatuses and a name of the specific print color, on the basis of the first table. The print color management apparatus further comprises a chart data creating section that creates print data of a chart including color patches for print color management and a first specific patch being different from the color patches for print color management, where color values are specified as colors of the color patches for print color management in the print data, and a color name is specified as color of the first specific patch in the print data on the basis of the first table. The print color management apparatus further comprises a chart judging section that obtains measured color data given by measuring, with the color measurement device, a chart printed by one of the plurality of image forming apparatuses on a basis of the print data of the chart, and judges, on a basis of the measured color data, whether the chart measured with the color measurement device is usable for print color management of a designated image forming apparatus among the plurality of image forming apparatuses. The print color management apparatus further comprises a print color management section that performs the print color management on the designated image forming apparatus, in accordance with a judgement result of the chart judging section.

A chart utilization control method reflecting one aspect of the present invention is a method of chart utilization control in a system including a plurality of image forming apparatuses, a color measurement device and a print color managing apparatus, where the plurality of image forming apparatuses each includes a color converter which accepts a color name specified as a print color. The method comprises creating, by the print color managing apparatus, a first table in which identification information of each of the plurality of image forming apparatuses, a specific print color assigned to the each of the plurality of image forming apparatuses, and a name of the specific print color are associated with each other. The method further comprises causing, by the print color managing apparatus, each of the plurality of image forming apparatuses to register the specific print color assigned to the each of plurality of image forming apparatuses and a name of the specific print color, on a basis of the first table. The method further comprises creating, by the print color managing apparatus, print data of a chart including color patches for print color management and a first specific patch being different from the color patches for print color management, wherein color values are specified as colors of the color patches for print color management in the print data, and a color name is specified as color of the first specific patch in the print data on a basis of the first table. The method further comprises printing a chart by one of the plurality of image forming apparatuses on a basis of the print data; and measuring colors of the chart printed by the one of the plurality of image forming apparatuses, with the color measurement device. The method further comprises, on a basis of measured color data of the chart obtained from the color measurement device, judging, by the print color managing apparatus, whether the chart measured with the color measurement device is usable for print color management of a designated image forming apparatus among the plurality of image forming apparatuses. The method further comprises performing, by the print color managing apparatus, the print color management on the designated image forming apparatus, in accordance with a result of the judging.

A non-transitory computer-readable storage medium reflecting one aspect of the present invention stores a chart utilization control program to be executed in a print color managing apparatus. The print color managing apparatus is communicably connected to a plurality of image forming apparatuses and a color measurement device, where the plurality of image forming apparatuses each includes a color converter which accepts a color name specified as a print color. The chart utilization control program, when being executed by a processor of the print color managing apparatus, causes the print color managing apparatus to perform the following processing. The processing comprises creating a first table in which identification information of each of the plurality of image forming apparatuses, a specific print color assigned to the each of the plurality of image forming apparatuses, and a name of the specific print color are associated with each other. The processing further comprises causing each of the plurality of image forming apparatuses to register the specific print color assigned to the each of plurality of image forming apparatuses and a name of the specific print color, on a basis of the first table. The processing further comprises creating print data of a chart including color patches for print color management and a first specific patch being different from the color patches for print color management, where color values are specified as colors of the color patches for print color management in the print data, and a color name is specified as color of the first specific patch in the print data on a basis of the first table. The processing further comprises obtaining measured color data given by measuring, with the color measurement device, a chart printed by one of the plurality of image forming apparatuses on a basis of the print data of the chart. The processing further comprises judging, on a basis of the measured color data, whether the chart measured with the color measurement device is usable for print color management of a designated image forming apparatus among the plurality of image forming apparatuses. The processing further comprises performing the print color management on the designated image forming apparatus, in accordance with a result of the judging.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 9 is an illustration illustrating another example of a chart according to one example of the present invention.

DESCRIPTION OF THE PREFERRED EMBODIMENTS

Figure 1:
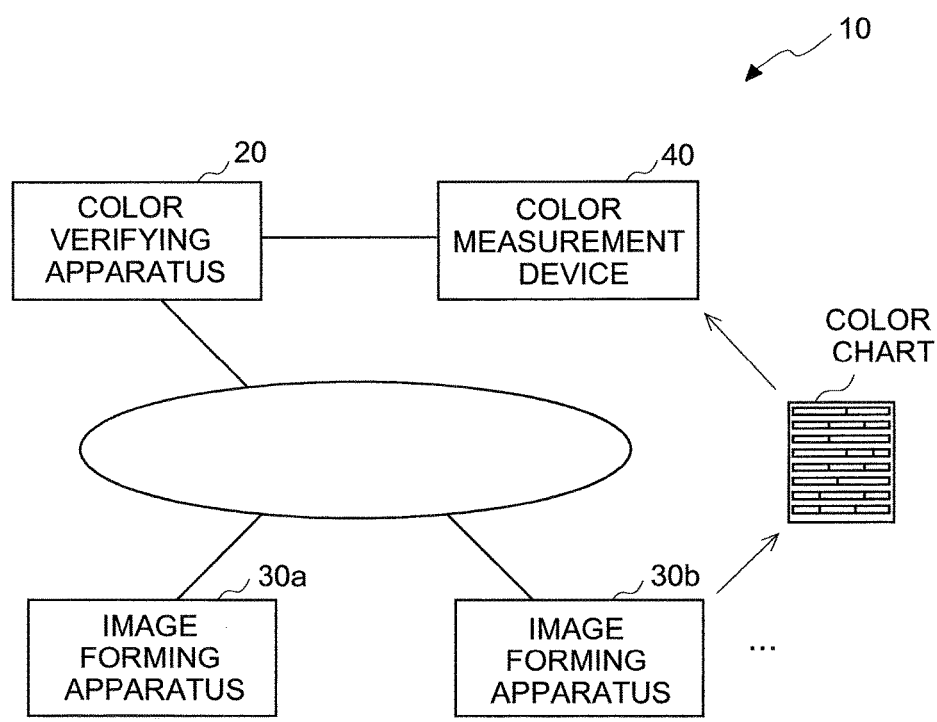
FIG. 1 is a schematic diagram illustrating an example of the structure of a management system according to one example of the present invention.

Hereinafter, an embodiment of the present invention will be described with reference to the drawings. However, the scope of the invention is not limited to the illustrated examples.

Print color managing apparatuses, chart utilization control methods, and non-transitory computer-readable storage media each storing a chart utilization control program as embodiments of the present invention can avoid an inappropriate use of a chart securely by a simple and easy technique.

The reason is that a print color managing apparatus communicably connected to plural image forming apparatuses and a color measurement device, performs the following control (when executing a chart utilization control program). That is, the print color managing apparatus creates a first table, and causes each of the image forming apparatuses to register the specific print color (spot color) assigned to the each of the image forming apparatuses and a name of the specific print color, on a basis of the first table, in advance. In the first table, identification information of each of the plurality of image forming apparatuses, a specific print color assigned to the each of the plurality of image forming apparatuses, and a name of the specific print color are associated with each other: for example, identification information of each of the plurality of image forming apparatuses, color values of a spot color assigned to the each of plurality of image forming apparatuses, and a name of the spot color are associated with each other. When instructing one of the plural image forming apparatuses to print a chart including color patches for print color management (including color verification) and identification information patches, the print color managing apparats creates print data of the chart by specifying a color name (a name of a spot color) as color of a first specific patch among the identification information patches on the basis of the first table. The print color managing apparatus further obtains measured color data as measurements of a chart printed on the basis of the print data. On the basis of the measured color data, the print color managing apparatus judges whether the measured chart is usable for print color management of a designated image forming apparatus among the plural image forming apparatuses. For example, the print color managing apparatus analyzes the measured color data to obtain measured color values of the first specific patch. When determining that the measured color values of the first specific patch is not associated with a target image forming apparatus designated as a target of print color management, by using the first table, the print color managing apparats can judge that the chart measured is an inappropriate chart and is not usable for the print color management of the target image forming apparatus.

The print color managing apparatus (when executing the chart utilization control program) may further create a second table in which figures and color values of corresponding print colors are associated with each other, in advance, and may instruct one of the image forming apparatuses to print a chart on the basis of the print data in which color values corresponding to figures expressing a date of instructing to print the chart, as colors of second specific patches among the identification information patches. When the print color managing apparatus analyzes the measured color data of the chart printed to obtain measured color values of the second specific patches, determines a date expressed by the figures associated with the measured color values of the second specific patches, by using the second table, and determines that a difference between the date determined and the current date exceeds a predetermined threshold, the print color managing apparats can judge that the chart measured is an inappropriate chart and is not usable for the print color management of the target image forming apparatus.

As described in BACKGROUND, color verification is performed on an image forming apparatus, by verifying the condition of color reproduction of printed matters, on the basis of measured color data given by reading with a color measurement device a chart printed by the image forming apparatus. Since the chart does not include identification information to indicate when and by which apparatus the chart was printed, it can cause an inappropriate use of the chart (for example, use of a chart printed by an image forming apparatus being different from a target apparatus, or use of a chart printed in the past). An inappropriate use of a chart makes appropriate execution of color verification difficult.

In view of the problem, there has been proposed a method to print a chart with identification information added, and read the identification information with a camera. However, this method needs an operator to operate the camera additionally to a color measurement device to read the chart, and makes the operator's operations complicated. Further, there has been proposed another method to create a color patch indicating identification information, print the color patch of identification information together with a chart, and read the color patch with a color measurement device. However, this method needs development of a technique to create a color patch indicating identification information and combine the color patch of identification information together with a chart, by using an image forming apparatus; and especially in a system including image forming apparatuses provided by various vendors, increases development cost of the system, which is a problem.

In view of that, a print color managing apparatus as an embodiment of the present invention is configured as follows. The print color managing apparatus is communicably connected to plural image forming apparatuses and a color measurement device. The print color managing apparatus creates a first table in which identification information of each of the image forming apparatuses, a specific print color (for example, a spot color) assigned to the each of the image forming apparatuses, and a name of the specific print color are associated with each other. Then, by using a color conversion function or a color converter which is installed in each image forming apparatus and is capable of accepting a color name specified as print color, the print color ma aging apparatus causes each image forming apparatuses to register the specific print color assigned to the each of the image forming apparatuses and a name of the specific print color, on the basis of the first table, in advance to printing a chart. Then, on instructing one of the image forming apparatuses to print a chart, the print co managing apparatus creates print data of the chart. In the print data, color values are specified as colors of the color patches for print color management and a color name (the name of a spot color) is specified as color of a first specific patch being different from the color patches for print color management on a basis of the first table. The print color managing apparatus obtains measured color data given by measuring, with the color measurement device, a chart printed by one of the image forming apparatuses on the basis of the print data of the chart. On the basis of the measured color data, the print color managing apparatus judges whether the chart measured is usable for print color management of a designated image forming apparatus among the plural image forming apparatuses. For example, the print color managing apparatus determines whether the first specific patch was printed in color associated with the spot color name, and judges, on the basis of a result of the determination, whether the measured chart is a chart printed by the designated image forming apparatus. Then the print color managing apparatus performs print color management on the designated image forming apparatus, in accordance with a result of the judgement.

In concrete terms, the print color managing apparatus creates a printer-dependent table in which identification information of each of the image forming apparatuses, color values of a corresponding spot color, and a name of the spot color are associated with each other, and instructs each of the image forming apparatuses to register information such as color values of a spot color and the name of the spot color. Each image forming apparatus is equipped with a spot-color registering function and registers the information of the spot color assigned to itself and the name of the spot color by using the spot-color registering function. Subsequently, when instructing one of the image forming apparatuses to print a chart in which plural color patches are arrayed, the print color managing apparatus embeds the name of the spot color as the color of a first specific patch (specifies the spot color name, rather than color values of the spot color, as the color of the first specific path) in print data of the chart. When printing the chart, the designated image forming apparatus prints the first specific patch in the color registered to be associated with the spot color name. Then, the print color managing apparatus analyzes measured color data obtained by measuring the printed chart with a color measurement device, to obtain measured color values of the first specific patch. By using the printer-dependent table, the print color managing apparatus determines whether the measured color values of the first specific patch is associated with the designated image forming apparatus to be a target of color management including color verification, and judges, on the basis of a result of the determination, whether the measured chart is an appropriate chart (whether the measured chart is usable for print color management of the designated image forming apparatus). Thus, since the first specific patch of the chart is printed in a color unique to an image forming apparatus, it can avoid inappropriate use of a chart, which was printed by an image forming apparatus being different from a target apparatus, before it happens and this realizes appropriate execution of color verification.

Optionally, the print color managing apparatus may create a printer-independent table in which printer-independent information (for example, figures to express a date) and color values of corresponding print colors. When instructing one of the image forming apparatuses to print a chart in which plural color patches are arrayed, the print color managing apparatus may embed date information as colors of second specific patches being different from the color patches for print color management (specifies color values corresponding to figures expressing date of instructing to print the chart, as the colors of the second specific patches) in print data of the chart, by using the printer-independent table. In response to the instructions to print the chart, the image forming apparatus prints the chart. Then, the print color managing apparatus may analyze measured color data obtained by measuring the printed chart with a color measurement device, to obtain measured color values of the second specific patches. By using the printer-independent table, the print color managing apparatus may determine a date expressed by figures associated with the measured color values of the second specific patches and compare the difference between the determined date and the current date with a predetermined threshold to judge, on the basis of a result of the determination, whether the measured chart is an appropriate chart and is usable for print color management of the designated image forming apparatus. For example, when determining that the difference between the determined date and the current date exceeds the predetermined threshold, the print color managing apparatus may judges that the measured chart is an inappropriate chart and is not usable for color verification of the designated image forming apparatus. Thus, when the chart including the second specific patches is created, the second specific patches are printed in colors corresponding to the figures indicating a date, and therefore, it can avoid inappropriate use of a chart printed in the past before it happens and this realizes appropriate execution of color verification.

Herein, a spot color can be reproduced by mixing CMYK toners at a specific ratio. In print data, for example, PDF (Portable document format) data, printing of a spot color can be instructed by specifying the name of the spot color. The way to specify a spot color in the PDF data, can be found in the specification documentation "ISO 32000-1:2008" published by the International Organization for Standardization (ISO). Further, ordinary image forming apparatuses are equipped with a function to register a spot color, and it makes development of a technique about the chart utilization at the side of the image forming apparatuses unnecessary even if a system includes age forming apparatuses provided by various vendors. Consequently, a system can be provided for users at low cost within a short delivery period.

EXAMPLE

Figure 2A:
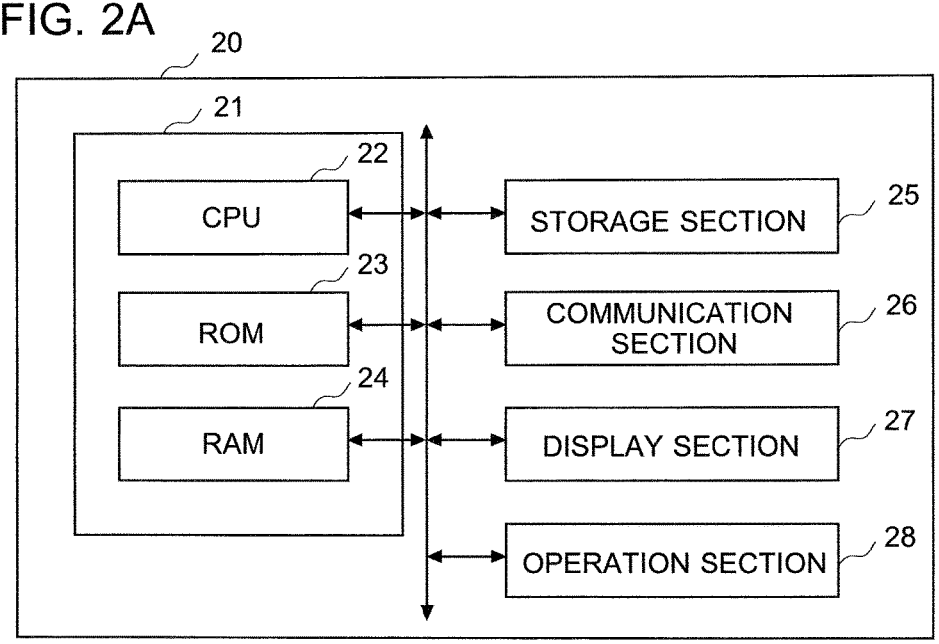
FIGS. 2A and 2B are block diagrams illustrating an example of the structure of a color verifying apparatus according to one example of the present invention.
Figure 2B:
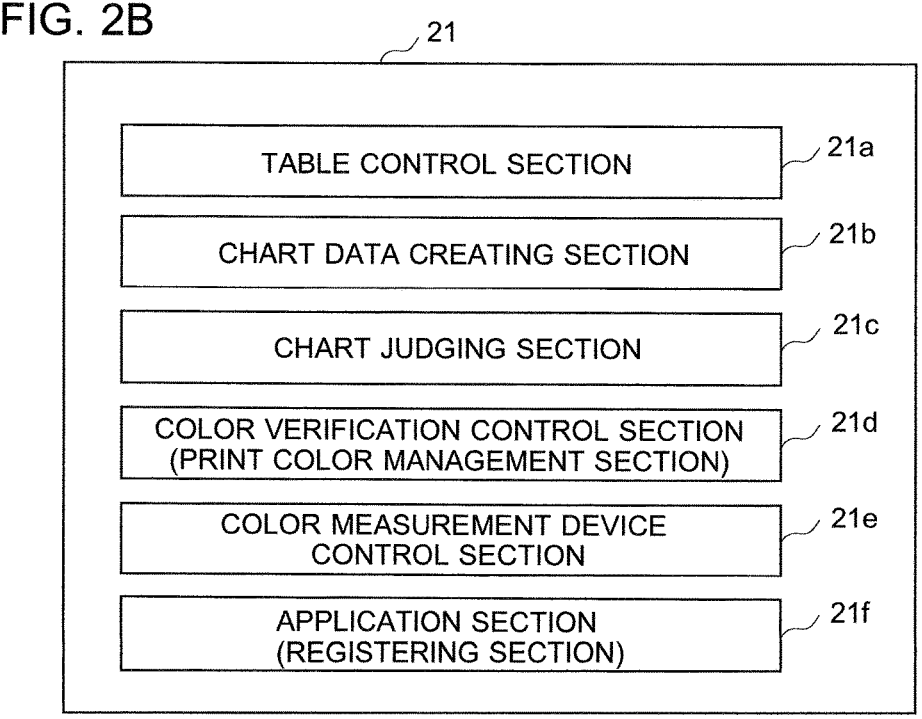
Figure 3A:
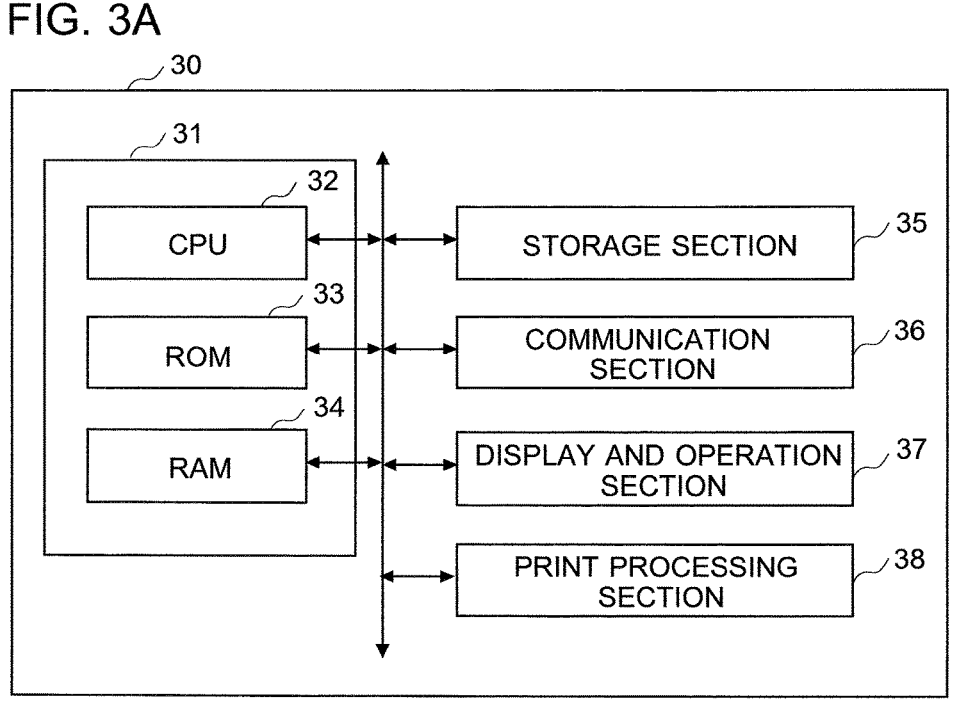
FIGS. 3A and 3B are block diagrams illustrating an example of the structure of an image forming apparatus according to one example of the present invention.
Figure 3B:
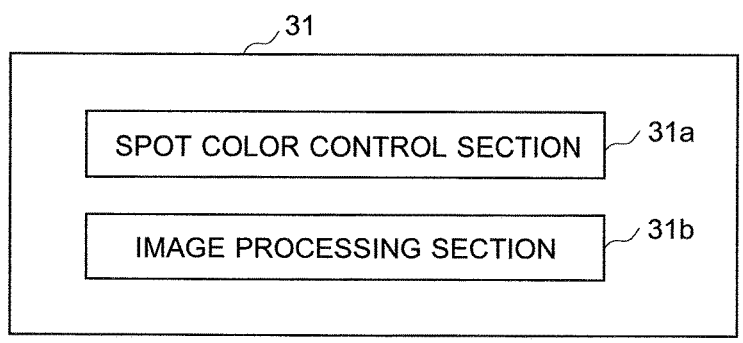

In order to describe in more detail the above-mentioned embodiment of the present invention, description will be given to an example of a print color managing apparatus, a chart utilization control method, and a non-transitory computer-readable storage medium storing a chart utilization control program with reference to FIG. 1 to FIG. 9. FIG. 1 is a schematic diagram illustrating an example of the structure of a management system of the present example. FIGS. 2A and 2B are block diagrams illustrating an example of the structure of a color verifying apparatus of the present example, and FIGS. 3A and 3B are block diagrams illustrating an example of the structure of an image forming apparatus of the present example. FIG. 4 to FIG. 7 each is a flowchart illustrating the operation of the color verifying apparatus of the present example. FIG. 8 and FIG. 9 each is a diagram illustrating an example of a chart of the present example. In the present example, description is given to a case of creating a chart to be used for color verification.

Management system 10 of the present example includes a plurality of image forming apparatuses (printers) 30, color measurement device 40 and a print color managing apparatus (which is assumed as color verifying apparatus 20 in the present example) for managing print colors of image forming apparatuses 30. FIG. 1 illustrates management system 10 including image forming apparatuses (printers) 30a and 30b as an example of the plurality of image forming apparatuses (printers) 30. The color verifying apparatus 20 and the image forming apparatuses 30 are communicably connected to each other via communication networks, such as an intranet. Further, the color verifying apparatus 20 and the color measurement device 40 are communicably connected to each other via a P2P (peer-to-peer) architecture. Hereinafter, each apparatus is described in detail.

Color Verifying Apparatus:

Color verifying apparatus 20 is a computing device or the like, and is configured to give one of image forming apparatuses 30 instructions to print a chart and performs color verification on one of image forming apparatuses 30 on the basis of measured color data given by measurement of a chart with color measurement device 40. As illustrated in FIG. 2A, color verifying apparatus 20 includes control section 21, storage section 25, communication section 26, display section 27 and operation section 28.

Control section 21 includes CPU (Central Processing Unit) 22 and memories, such as ROM (Read Only Memory) 23 and RAM (Random Access Memory) 24. ROM 23 memorizes control programs and data needed for control processing. RAM 24 memorizes data needed for control processing performed by CPU 22 and data needed to be memorized temporarily during the control processing. CPU 22 reads out programs from the ROM 23, loads the programs onto RAM 24, and executes the programs, thereby performing the overall control of the color verifying apparatus 20.

As illustrated in FIG. 2B, the control section 21 functions also as table control section 21a, chart data creating section 21b, chart judging section 21c, color verification control section (print color management section) 21d, color measurement device control section 21e and application section (registering section) 21f.

Table control section 21a creates information in which a piece of information depending on each of image forming apparatuses 30 and corresponding color are associated with each other, and records the information into storage section 25. In concrete terms, table control section 21a creates a printer-dependent table and records the printer-dependent table to storage section 25, where in the printer-dependent table, identification information of each of image forming apparatuses 30 (for example, a printer ID, which is a unique ID of each of image forming apparatuses 30), a specific print color assigned to the each of image forming apparatuses 30 (color values of a spot color), and the name of the specific print color (the name of the spot color) are associated with each other.

Table control section 21a further creates information in which a piece of information being independent from image forming apparatus 30 and corresponding color are associated with each other, and records the information to storage section 25. In concrete terms, table control section 21a creates a printer-independent table and records the printer-independent table to storage section 25, where in the printer-independent table, figures expressing a date and color values of colors corresponding to the fires are associated with each other. On recording the printer-dependent table and the printer-independent table, table control section 21a records the printer-dependent table and the printer-independent table with being associated with each other so as to manage the tables as a group of information (in other words, so as to perform group control on the tables).

Chart data creating section 21b creates print data of a color verification chart including an array of plural color patches (in other words, data including descriptions of the sizes, positions and information to specify colors of color patches of the chart). On creating the print data of the chart, chart data creating section 21b arranges, in the chart, one or more color patches to be used for identification of a chart (referred to as identification information patch or patches) additionally to color patches to be used for print color management such as color verification (referred to as color verification patches in the present example). Chart data creating section 21b embeds a piece of information to identify an image forming apparatus to which instructions to print a chart is given and a piece of information to identify a date, into the identification information patches. In concrete terms, chart data creating section 21b specifies color values as the colors of color verification patches, and specifies a name of a spot color as the color of a part of the identification information patches (a first specific patch), by referring to the printer-dependent table, where the spot color corresponds to the image forming apparatus to which instructions to print a chart is given. As the colors of other part of the identification information patches (second specific patches), chart data creating section 21b specifies color values corresponding to figures expressing a date (for example, figures of a six-digit number composed of the last two digits of year, two digits of month and two digits of day) when instruction to print the chart is given, such as the current date, by referring to the printer-independent table.

Chart judging section 21c obtains measured color data given by measuring with color measurement device 40 a chart printed by image forming apparatus 30 on the basis of the print data of the chart, analyzes the measured color data obtained from the color measurement device 40, and judges whether the measured chart is an appropriate chart (judges whether the measured chart is usable for print color management on a target image forming apparatus 30 designated as a target of print color management), on the basis of the measured color values of identification information patches. In concrete terms, chart judging section 21c analyzes the measured color data to obtain measured color values of the first specific patch, and judges whether the measured color values of the first specific patch are associated with the target image forming apparatus 30 for the color measurement, which includes color verification, by using the printer-dependent table. Further, chart judging section 21c analyzes the measured color data to obtain measured color values of the second specific patches, determines the date (date when instructions to print the chart were given) expressed by figures associated with the measured color values of the second specific patches, by using the printer-independent table, and judges whether the difference between the determined date and the current date exceeds a predetermined threshold. If the measured color values of the first specific patch are not associated with the target image forming apparatus 30 for print color management, which includes color verification, or if the difference between the determined date and the current date exceeds the threshold, chart judging section 21c judges that the measured chart is an inappropriate chart (the measured chart is not usable for print color management of the target image forming apparatus 30 designated as a target of print color management including color verification), and optionally operates display section 27 to display an error message. On the other hand, if the measured color values are associated with the target image forming apparatus 30 as a target of print color management, which includes color verification, and the difference between the determined date and the current date is not greater than the threshold, chart judging section 21c judges that the measured chart is an appropriate chart (the measured chart is usable for print color management of the target image forming apparatus 30 designated as a target of print color management, which includes color verification).

Color verification control section 21d is a print color management section which performs print color management on the target image forming apparatus 30. When the chart judging section 21c judges that the measured chart is an appropriate chart, color verification control section 21d analyzes the measured color data to obtain color values of the color verification patches, compares the obtained measured color values with the color values specified in the print data by chart data creating section 21b, and thereby performs color verification which verifies whether the image forming apparatus 30 as a target of color verification represents colors at the expected level.

Color measurement device control section 21e controls color measurement device 40 to measure colors of color verification patches and identification information patches in a chart, and obtains measured color data of the chart from color measurement device 40.

Application section 21f executes a job transmitting application program (such as a printer driver and a hot folder) which gives print instructions to image forming apparatus 30 and a spot color registering application which registers a spot color to the image forming apparatus 30. For example, the printer driver, when being executed, creates print data to instruct to print a color verification chart. The print data are data in a language readable by the image forming apparatuses 30, for example, PDL (Page Description Language) data described in a page description languages, such as PJL (Printer Job Language), PS (PostScript) and PCL (Printer Control Language); or PDF data. Further, the spot color registering application (for example, a registering component, such as a spot color registering function, included in a printer driver), when being executed, works as a registering section and transmits table created for each of image forming apparatuses 30 by table control section 21a to the corresponding image forming apparatus 30, and instructs each of the image forming apparatuses 30 (spot color control section 31a which will be described later) to register the corresponding spot color. In concrete terms, in this table, information of a specific print color assigned to each of the image forming apparatuses 30 and the name of the specific print color (color values of a spot color assigned to each of the image forming apparatuses 30 and the name of the spot color) are associated with each other.

Table control section 21a, chart data creating section 21b, chart judging section 21c, color verification control section 21d, color measurement device control section 21e, and application section 21f may be constituted as hardware devices. Alternatively, the table control section 21a, chart data creating section 21b, chart judging section 21c, color verification control section 21d, color measurement device control section 21e, and application section 21f may be provided by a chart utilization control program which causes the control section 21 to function as these sections when being executed by CPU 22. That is, the control section 21 may be configured to serve as the table control section 21a, chart data creating section 21b, chart judging section 21c, color verification control section 21d, color measurement device control section 21e, and application section 21f, when CPU 22 executes the chart utilization control program.

Storage section 25 is constituted by a memory, such as a HDD (Hard Disk Drive) and a SSD (Solid State Drive). The storage section 25 stores various programs (for example, the above-described chart utilization control program, job transmission application and spot color registering application) and data (for example, print data of a color verification chart, a printer-dependent table, a printer-independent table and measured color data).

Communication section 26 includes a component such as a NIC (Network Interface Card) and a modem, and performs data communication with the image forming apparatuses 30 and color measurement device 40. In concrete terms, communication section 26 sends information to instruct image forming apparatus 30 to record a spot color and print data of a chart, and receives measured color data given by measurement of a chart with color measurement device 40.

Display section 27 includes a display, such as a LCD (Liquid Crystal splay) and an OEL (organic electroluminescence) display, and displays a screen for registering a spot color, a screen for giving instructions to print a chart, a screen relating to color verification and the like. Operation section 28 includes a device, such as a mouse and a keyboard, and receives user's operations to register a spot color, user's operations to give instructions to print a chart and user's operations relating to color verification.

Image Forming Apparatus:

Image forming apparatus 30 is a multi-functional peripheral (MFP) or the like, and is equipped with a color converter which accepts a color name and prints a specific color corresponding to the specified color name. As illustrated in FIG. 3A, image forming apparatus 30 includes control section 31, storage section 35, communication section 36, display and operation section 37 and print processing section 38.

Control section 31 includes CPU 32 and memories, such as ROM 33 and RAM 34. ROM 33 memorizes control programs and data needed for control processing. RAM 34 memorizes data needed for control processing performed by CPU 32 and data needed to be memorized temporarily during the control processing. CPU 32 reads out programs from the ROM 33, loads the programs onto RAM 34, and executes the programs, thereby performing the overall control of the image forming apparatus 30.

As illustrated in FIG. 3B, the control section 31 functions also as spot color control section 31a and image processing section 31b.

Spot color control section 31a, in response to receiving instructions given by color verifying apparatus 20, accepts a spot color and searches for the spot color. In concrete terms, spot color control section 31a registers a spot color table obtained by color verifying apparatus 20. When finding a spot color name specified as a color of a first specific patch in print data of a color verification chart, spot color control section 31a refers to the table and converts the color specified for the first specific patch into the color values of the spot color.

Image processing section 31b analyzes print data sent from color verifying apparatus 20 and creates images of patches in colors specified in the print data (if a spot color name is specified as a color of a color patch in the print data, creates an image of the patch in the spot color converted by spot color control section 31a). Image processing section 31b creates an image of a chart in which color patches are arrayed by using the images of the color patches, and sends data of the chart image to print processing section 38.

Storage section 35 is constituted by a memory, such as a HDD and a SSD, and stores various programs and data (for example, a spot color table, print data, a chart image created from the print data, and so on).

Communication section 36 includes a component such as a NIC and a modem, and receives information of instructions to register a spot color and print data to instruct to print a chart, given by color verifying apparatus 20. Display and operation section 37 includes a touch panel in which a touch sensor composed of lattice-shaped transparent electrodes is formed on a display unit, such as an LCD and OEL display. Display and operation section 27 displays various kinds of screens relating to printing and allows a user to perform various operations on the screens.

Print processing section 38 creates images on sheets of paper on the basis of image data received from image processing section 31b, by using an electrophotographic process. In concrete terms, print processing section 38 includes an exposure unit, a photoreceptor unit, an intermediate transfer belt, a secondary transfer roller, a fixing unit and a conveying section. The exposure unit is configured to irradiate a photoreceptor drum with a laser beam in accordance with image data, to perform exposure processing. The photoreceptor unit is configured to form a toner image in each color of C, M, Y, and K, and includes photoreceptor drums, developing units, charging units, photoreceptor cleaning units, and primary transfer rollers. The intermediate transfer belt is rotated by rollers and functions as an intermediate transfer body to convey toner images formed by the photoreceptor unit to a sheet of paper. The secondary transfer roller transfers toner images formed on the intermediate transfer belt onto a sheet of paper. The fixing unit fixes toner images transferred onto a sheet of paper. The conveying section includes a sheet feeding roller, a registration roller, a loop roller, a reversing roller, and a sheet ejecting roller, and the like.

Color Measurement Device:

Color measurement device 40 measures colors of a chart. Color measurement device 40 is controlled by color measurement device control section 21e of color verifying apparatus 20 to measure colors of color verification patches and identification information patches by using, for example, a spectrum-based method which measures light intensity as a function of the wavelength of light (like a spectrophotometer) and output measured color data (color values of color patches) to color verifying apparatus 20.

FIG. 1, FIGS. 2A and 2B, and FIGS. 3A and 3B illustrate an example of the management system 10 of the present example, and its constitution can be modified appropriately. For example, as the color verifying apparatus 20, an apparatus prepared only for color verification may be employed. Alternatively, a general-purpose computing device or a server apparatus may serve as the color verifying apparatus 20 (by executing a chart utilization control program).

Hereinafter, description is given to an example of the operation of the color verifying apparatus 20. CPU 22 loads the chart utilization control program stored in ROM 23 onto the RAM 24 and executes the program, thereby executing processing of steps shown in the flowchart in FIG. 4 to FIG. 7. In the following descriptions, it is supposed that the management system 10 includes two image forming apparatuses 30 of printer A and printer B. The printer A and the printer B may be products from the same vendor or products from different vendors.

Figure 4:
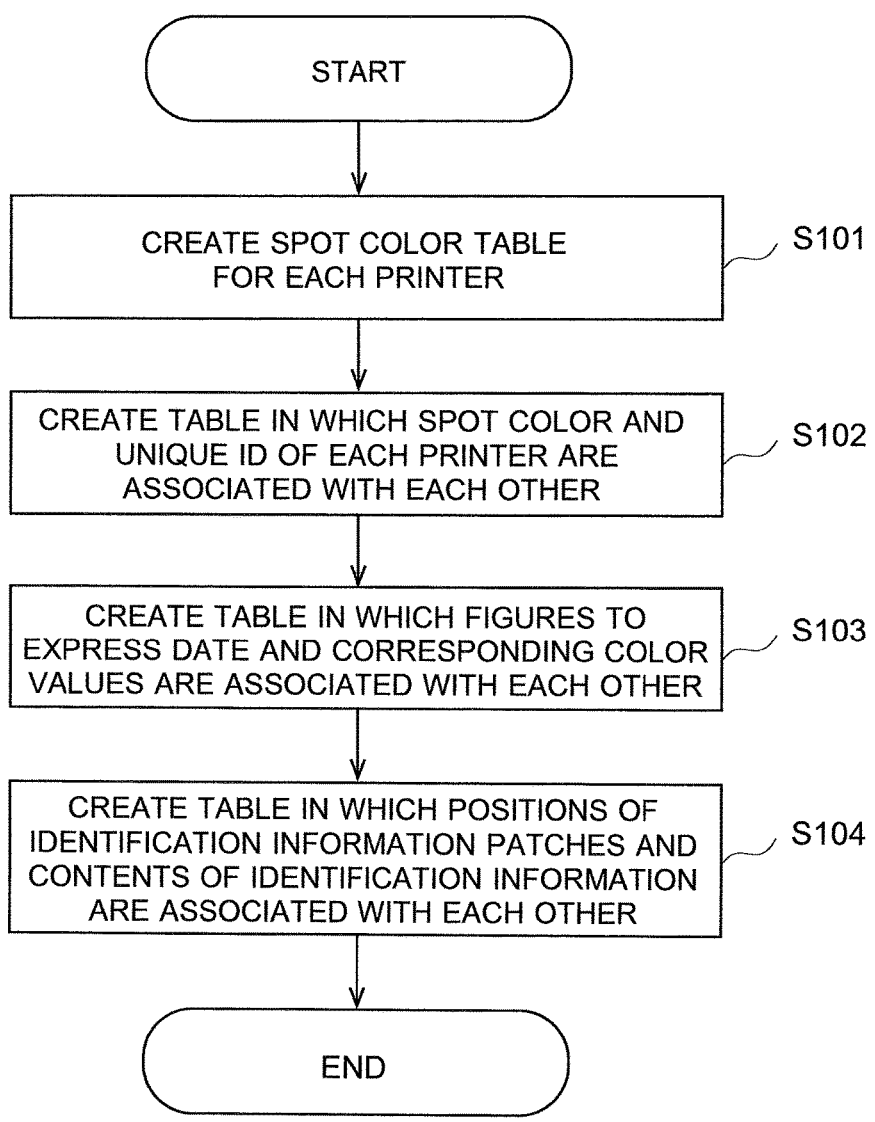
FIG. 4 is a flowchart illustrating the operation (table creation processing) of the color verifying apparatus according to one example of the present invention.

Table Creation Processing:

As illustrated in the flowchart in FIG. 4, control section 21 (table control section 21a) creates a spot color table in which a spot color name, as a name of a specific print color, assigned to each of printers A and B is associated with the color values (CMYK values) of a spot color identified by the given name (S101). Table 1 shows an example of the spot color table of printer A, and Table 2 shows an example of the spot color table of printer B. The spot color names and color values in the tables are given for an exemplification purpose, and the spot color names and color values may be changed arbitrarily as far as printer A and the printer B can register or put on record the spot colors.

TABLE 1

| Spot Color Name | Color Values (C, M, Y, K) [%] |
|---|---|
| Printer0000 | (95, 0, 0, 0) |

TABLE 2

| Spot Color Name | Color Values (C, M, Y, K) [%] |
|---|---|
| Printer0001 | (45, 0, 0, 0) |

Next, table control section 21a associates a unique ID of each printer (printer ID) with the corresponding spot color name and the color values of the spot color, to create a table (a printer-dependent table) in which the spot color tables of the printers are unified (S102). Table 3 shows an example of the printer-dependent table. Printer IDs may be defined by color verifying apparatus 20, or alternatively, may be defined by respective image forming apparatuses 30 and then obtained by color verifying apparatus 20 from the respective in age forming apparatuses 30. The allowable range in the table indicates a range of each of the CMYK values within which the printed color can be perceived as the same spot color. For example, the allowable range in the table indicates that the spot color identified by the spot color name "Printer0000" is a color with color values within a range of (90, 0, 0, 0) to (100, 0, 0, 0). As the allowable range, the same value may be defined for all the printers, or different values may be defined for respective printers in consideration of the performance of printers.

TABLE 3

| Spot Color Name | Color Values (C, M, Y, K) [%] | Allowable Range[%] | Printer ID | Printer Name |
|---|---|---|---|---|
| Printer0000 | (95, 0, 0, 0) | ±5 | 0000 | A |
| Printer0001 | (45, 0, 0, 0) | ±5 | 0001 | B |
| — | — | — | — | — |

Next, table control section 21a creates a table (printer-independent table) in which figures to express a date and color values of corresponding print colors are associated with each other (S103). Table 4 shows an example of the printer-independent table. Herein, the allowable range in the table indicates a range of each of the CMYK values within which the printed color can be perceived as the same print color. As the allowable range, the same value may be defined for all the print colors, or different values may be defined for respective print colors in consideration of the performance of printers and color measurement device. In the present example, figures of zero to nine are associated with color values of respective print colors. Alternatively, figures expressing a plural-digit number may be associated with color values of one print color. For example, the tens digit of the number may be associated with the C value, and the units digit of the number may be associated with the M value. TABLE 4

TABLE 4

| Figures to Express Date | Color Values (C, M, Y, K) [%] | Allowable Range [%] |
|---|---|---|
| 0 | (95, 0, 0, 0) | ±5 |
| 1 | (75, 0, 0, 0) | ±5 |
| 2 | (55, 0, 0, 0) | ±5 |
| 3 | (35, 0, 0, 0) | ±5 |
| 4 | (0, 95, 0, 0) | ±5 |
| 5 | (0, 75, 0, 0) | ±5 |
| 6 | (0, 55, 0, 0) | ±5 |
| 7 | (0, 35, 0, 0) | ±5 |
| 8 | (0, 0, 95, 0) | ±5 |
| 9 | (0, 0, 75, 0) | ±5 |

Then, table control section 21a creates a table in which the position of each identification information patch and the contents of the corresponding identification information are associated with each other (S104). Table 5 shows an example of this table. In the present example, date is expressed with a six-digit number composed of the last two digits of year, two digits of month and two digits of day. As another example, date may be expressed with a four-digit number composed of two digits of month and two digits of day under the condition that there is a low probability that a chart created one year or more ago can be inappropriately used for color verification. As another example, date may be expressed with a four-digit number composed of the last two digits of year and two digits of month under the condition that a problem would not arise in color verification even if a chart left for several weeks after it was created is used. As another example, date may be expressed with an eight-digit number using extra two digits expressing hour under the condition that a result of color verification varies depending on the time when the chart was printed. Further, the order in which pieces of identification information are associated with the identification information patch positions may be defined arbitrarily, for example, printer ID may be associated with the identification information patch position "1". Further, the present example employs, as the identification information, a piece of information to identify a spot color and a piece of information to identify date. However, it is permissible that the identification information includes at least a piece of information to identify a spot color. Further, in addition to the above items, the identification information may include other kinds of information, such as conditions of color verification, identification information of color verifying apparatus 20, information to identify a user who instructs execution of color verification, and identification information of a chart.

TABLE 5

| Identification Information Patch Position | Identification Information |
|---|---|
| 1 | last two digits of year |
| 2 | |
| 3 | two digits of month |
| 4 | |
| 5 | two digits of day |
| 6 | |
| 7 | spot color name |
| — | — |

Figure 5:
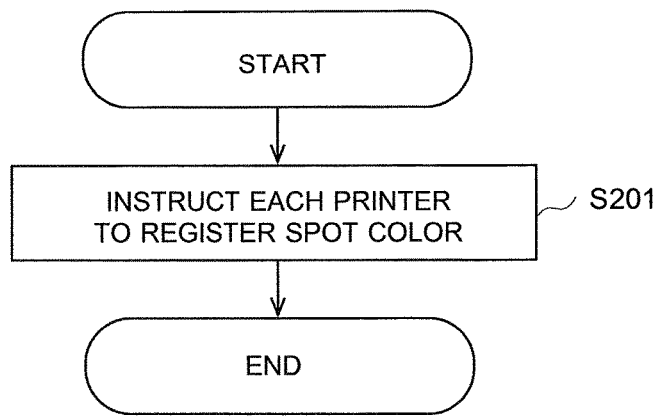
FIG. 5 is a flowchart illustrating the operation (spot color registration processing) of the color verifying apparatus according to one example of the present invention.

Spot Color Registration Processing:

As illustrated in the flowchart in FIG. 5, control section 21 (spot color registering application of application section 21f) accesses printer A and printer B, passes the spot color table shown in Table 1 to printer A and the spot color table shown in Table 2 to printer B, and gives instructions to each printer to register the name and color values of corresponding spot color (S201). In response to receiving the instructions, spot color control section 31a of each printer registers the received spot color table. With this processing, each printer becomes capable of printing a color patch the color of which is specified by a spot color name, by using the color values of the spot color defined in the spot color table.

Figure 6:
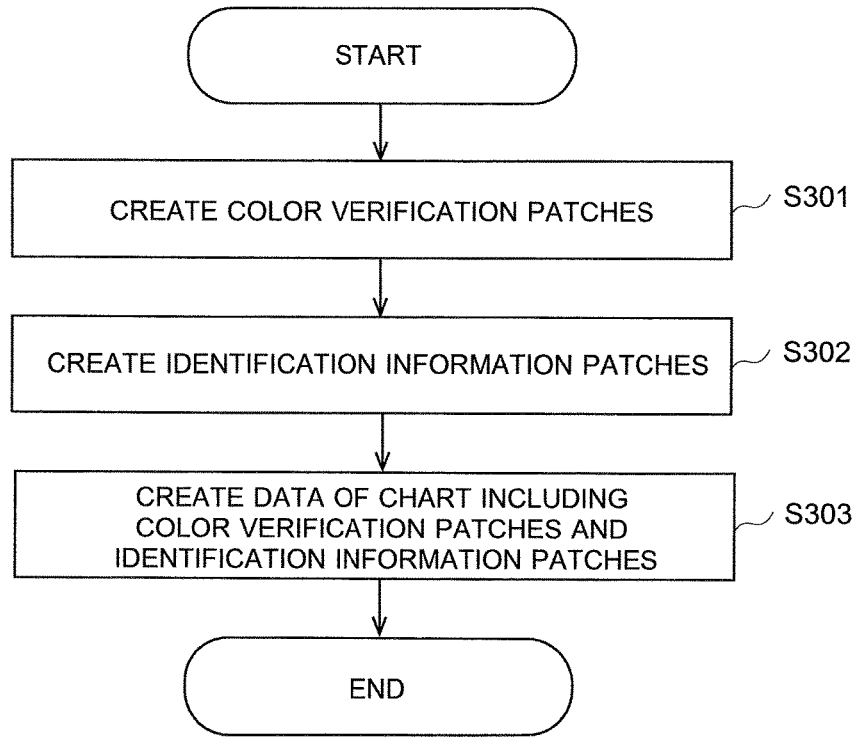
FIG. 6 is a flowchart illustrating the operation (chart data creation processing) of the color verifying apparatus according to one example of the present invention.

Chart Data Creation Processing:

As illustrated in the flowchart in FIG. 6, control section 21 (chart data creating section 21b) creates color verification patches (S301). The color verification patches have respective colors such that the color values of the patches are gradually changed for each of CMYK values. Next, the chart data creating section 21b creates identification information patches (S302). The identification information patches include a first specific patch (the color patch at Position ID 7) the color of which is specified by a spot color name and second specific patches (the color patches at Position IDs 1 to 6) the colors of which are specified by color values corresponding to respective figures expressing a date. Successively, chart data creating section 21b creates print data of the chart in which the color verification patches and the identification information patches are arranged in the respective positions (S303), and sends the print data of the chart to one of image forming apparatuses 30. In other words, in the created print data, color values are specified as the colors of the color verification patches; and a spot color name, to which instructions to print the chart is given, and color values corresponding to figures expressing a date are specified as colors of the identification information patches. The image forming apparatus 30 prints a chart in accordance with the print data. FIG. 8 illustrates an example of chart 50 printed by the image forming apparatus 30. On the chart 50, color verification patches 51 and identification information patches 52 are arrayed. In the case where the chart 50 is created for printer A on Jan. 28, 2015, the control section 21 assigns the following pieces of information to Position IDs 1 to 7 of the identification information patches 52, on the basis of the table shown in Table 5.

Position ID 1: 1

Position ID 2: 5

Position ID 3: 0

Position ID 4: 1

Position ID 5: 2

Position ID 6: 8

Position ID 7: Printer A

The control section 21 converts the pieces of information assigned to respective Position IDs of identification information patches into color values (C, M, Y, K values) and a spot color name by using the tables shown Tables 3 and 4 as follows (also refer to FIG. 9) to create the print data.

Position ID 1: (75, 0, 0, 0)

Position ID 2: (0, 75, 0, 0)

Position ID 3: (95, 0, 0, 0)

Position ID 4: (75, 0, 0, 0)
Position ID 5: (55, 0, 0, 0)
Position ID 6: (0, 0, 95, 0)
Position ID 7: "Printer0000", alternative color (0, 0, 0, 0)

Herein, the alternative color indicates a color used in the case where a specified spot color name does not exist on record of the printer.

Figure 7:
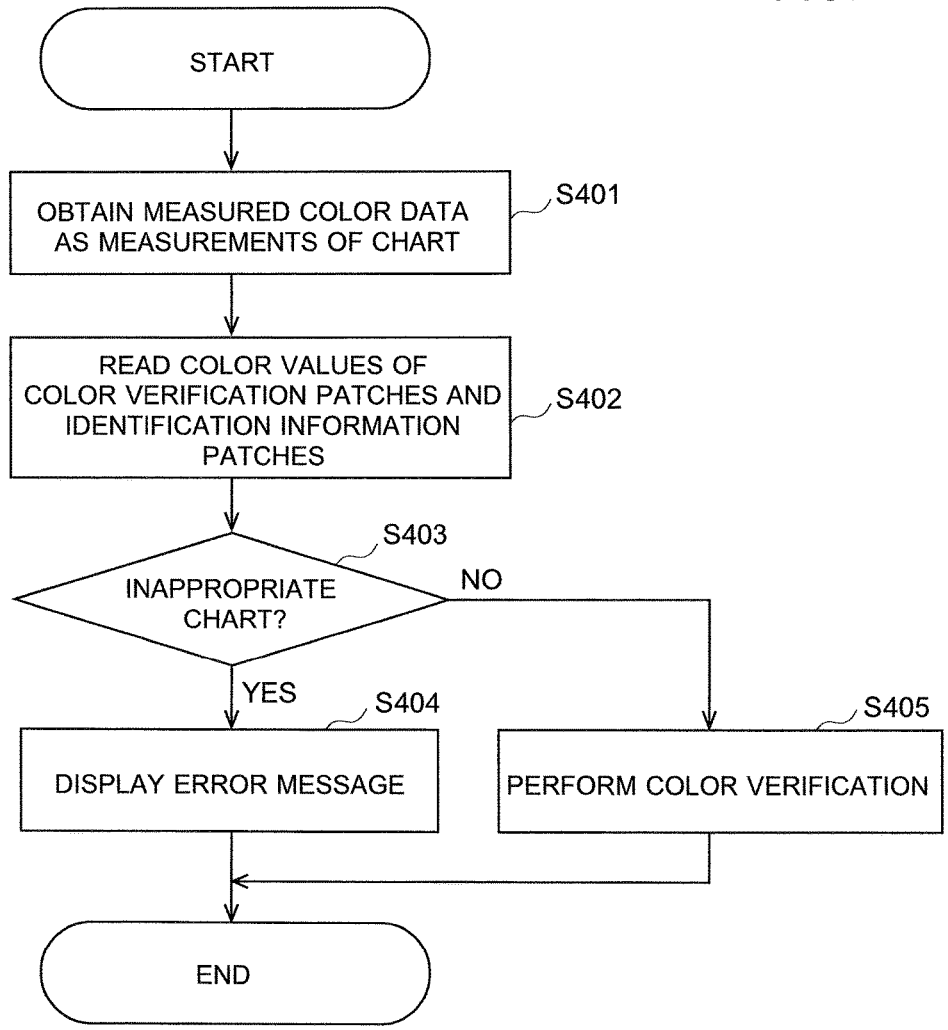
FIG. 7 is a flowchart illustrating the operation (chart judgment processing) of the color verifying apparatus according to one example of the present invention.
Figure 8:
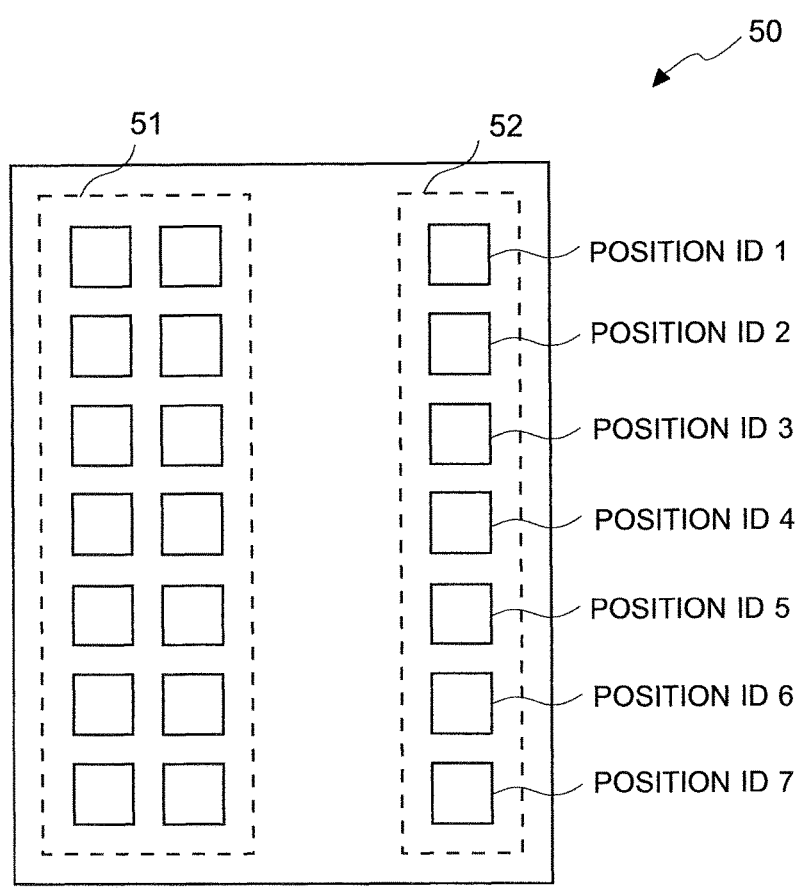
FIG. 8 is an illustration illustrating an example of a chart according to one example of the present invention.

Chart Judgement Processing:

As illustrated in the flowchart in FIG. 7, control section 21 (color measurement device control section 21e) controls color measurement device 40 to measure colors of color patches in the chart printed, and obtains measured color data (S401). Next, control section 21 (chart judging section 21c) analyzes the measured color data to read out the color values of the identification information patches (S402), and judges, based on the measured color values of the identification information patches, whether an inappropriate chart has been measured (whether the measured chart is usable for print color management) (S403). In concrete terms, control section 21 judges by using the printer-dependent table created in the flow shown in FIG. 4 whether the measured color values of the first specific patch is associated with the printer designated as a target of print color management including color verification, and further judges by using the printer-independent table created in the flow shown in FIG. 4 whether a difference between the determined date and the current date is not greater than (equal to or less than) a predetermined threshold.

If judging that the measured chart is an inappropriate chart (the measured color values of the first specific patch are not associated with the printer designated as a target of print color management including color verification, or the difference between the determined date and the current date exceeds the predetermined threshold), control section 21 (chart judging section 21c) controls display section 27 to display an error message (S404). The contents of the error message are not limited specifically. For example, the error message may be made to a message that the measured chart is a chart inappropriate for color verification and color verification should not be performed with the chart. On the other hand, if judging that the measured chart is an appropriate chart (the measured color values of the first specific patch are associated with the printer designated as a target of print color management including color verification, and the difference between the determined date and the current date is not greater than the predetermined threshold), control section 21 (color verification control section 21d) analyzes the measured color data to read out the measured color values of the color verification patches, and performs color verification on the basis of the obtained color values of the color verification patches (S405).

Description is given to the above-mentioned chart judgment processing, by using the chart printed by printer A on the basis of the print data of the chart created by chart data creating section 21b in the flow illustrated in FIG. 6. When the identification information patches 52 in the chart 50 in FIG. 9 are measured with color measurement device 40, the following color values of color patches are obtained.

Position ID 1: (75, 0, 0, 0)
Position ID 2: (0, 75, 0, 0)
Position ID 3: (95, 0, 0, 0)
Position ID 4: (75, 0, 0, 0)
Position ID 5: (55, 0, 0, 0)
Position ID 6: (0, 0, 95, 0)
Position ID 7: (95, 0, 0, 0)

The reason why the values (95, 0, 0, 0) are obtained as the color values of the color patch at Position ID 7 is that, in response to finding a spot color name specified as a color of a color patch in printing processing of the print data of the chart, printer A prints the color patch in the spot color corresponding to the spot color name on the basis of the spot color table shown in Table 1 registered beforehand to the printer. The color values of the identification information patches 52 are converted by the control section 21 into the following values by using the tables shown in Table 3 and Table 4.

Position ID 1: 1
Position ID 2: 5
Position ID 3: 0
Position ID 4: 1
Position ID 5: 2
Position ID 6: 8
Position ID 7: Printer A According to the pieces of information of the color patches at Position ID 1 to Position ID 6, control section 21 determines that the chart was created on Jan. 28, 2015. Comparing the date and the current date, control section 21 can judge whether the measured chart is an inappropriate chart that was printed in the past, on the basis of whether the chart was measured within a predetermined period (for example, in two days) from the creation of the chart. For example, when the difference between the determined date and the current date exceeds the predetermined threshold, control section 21 can judge that the measured chart is not usable for print color management (color verification) of printer A. Further, according to the piece of information of the color patch at Position ID 7, control section 21 determines that the measured chart was printed by printer A. Thereby, on the basis of whether the determined printer coincides with a printer for which color verification is to be performed, control section 21 can judge whether the measured chart is an inappropriate chart which was printed by another printer. In other words, on the basis of whether the color values of the identification information patch at Position ID 7 is associated with printer A, control section 21 can judge whether the measured chart is usable for print color management (color verification) of printer A.

If printer B prints print data of the chart created by chart data creating section 21b in the flow shown in FIG. 6 and the printed chart is measured with color measurement device 40, the following color values of color patches are obtained.

Position ID 1: (75, 0, 0, 0)
Position ID 2: (0, 75, 0, 0)
Position ID 3: (95, 0, 0, 0)
Position ID 4: (75, 0, 0, 0)
Position ID 5: (55, 0, 0, 0)
Position ID 6: (0, 0, 95, 0)
Position ID 7: (0, 0, 0, 0)

Since the spot color "Printer0000" specified as a color of the color patch at Position ID 7 in the print data does not exist in the spot color table (shown in Table 1) of printer B, printer B prints the color patch at Position ID 7 using the alternative color (0, 0, 0, 0). The color values of the identification information patches 52 are converted by the control section 21 into the following values by using tables shown in Tables 3 and Tables 4.

Position ID 1: 1
Position ID 2: 5
Position ID 3: 0
Position ID 4: 1
Position ID 5: 2
Position ID 6: 8
Position ID 7: no information According to the piece of information of the color patch at Position ID 7, the control section 21 cannot associate the color values of the identification information patch at Position ID 7 with printer A, and determines that the chart created for printer A was printed by another printer. Therefore, an inappropriate use of a chart can be avoided before it happens.

As described above, when giving an image forming apparatus instructions to print a chart, the control section of the color managing apparatus (color verifying apparatus) arranges color patches for identification information additionally to color patches for print color management into the chart; and specifies a spot color name rather than color values as a color of a first specific patch in the identification information patches and optionally specifies color values corresponding to figures expressing a date as colors of second specific patches in the identification information patches to create print data of the chart. Then, the control section analyzes measured color data given by measuring the printed chart with a color measurement device, to obtain measured color values of the color patches in the chart; and determines a printer and optionally a date corresponding to the measured color values obtained. Thereby, the control section can judge whether the measured chart is an appropriate chart and is usable for print color management of the image forming apparatus designated as a target of the print color management, which allows appropriate execution of the print color management including color verification.

In the present example, the identification information patches are composed of the first specific patch (the color patch at Position ID 7) the color of which a spot color name is specified as and the second specific patches (the color patches at Position ID 1 to Position ID 6) the colors of which color values corresponding to figures expressing a date are specified as. It should be noted that it is not necessary that the identification information patches are composed of both of the first specific patch and the second specific patches, and the identification information patches may be composed of at least the first specific patch of which a spot color name is specified as. That is, creating the printer-independent table at S103 in the flowchart shown in FIG. 4, and associating Position ID 1 to Position ID 6 of the identification information patches with the contents of the corresponding pieces of identification information at S104 in the flowchart shown in FIG. 4, and creating identification information patches at Position ID 1 to Position ID 6 at S302 in the flowchart shown in FIG. 6, may be optionally performed. In the chart judgement processing, by analyzing measured color data of the printed chart to obtain the measured color values of the first specific chart and judging whether the measured color values of the first specific patch are associated with a printer designated as a target of print color management, the print color managing apparatus can judge whether the measured chart is an appropriate chart and is usable for the print color management.

The present invention should not be limited to the description in the above example, and its constitution and control can be modified appropriately unless the modification deviates from the intention of the present invention.

For example, the above example employs a chart for color verification. However, the control of the present invention can be applied similarly to arbitrary printed matters needed to be determined which of image forming apparatuses 30 printed them or when there were printed.

Further, in the above example, a spot color was used as a specific print color. However, the control of the present invention can be applied similarly to a technique using an arbitrary color which can be registered by using a spot-color registering function of an image forming apparatus.

The present invention is applicable to print color managing apparatuses which perform print color management of an image forming apparatus on the basis of a chart printed by the image forming apparatus; chart utilization control methods to be used in a system including the print color managing apparatus; chart utilization control programs; and non-transitory computer-readable storage media each storing the chart utilization control program.

The invention claimed is:

1. A print color managing apparatus which is communicably connected to a plurality of image forming apparatuses and a color measurement device, the plurality of image forming apparatuses each including a color converter which accepts a color name specified as a print color, the print color management apparatus comprising:
   a memory; and
   a processor which is configured to:
   create a first table in which identification information of each of the plurality of image forming apparatuses and a specific print color assigned to the each of the plurality of image forming apparatuses are associated with each other, wherein the specific print colors which are respectively assigned to the plurality of image forming apparatuses are different from one another;
   store the created first table in the memory;
   cause each of the plurality of image forming apparatuses to register the specific print color assigned thereto, based on the first table;
   create print data of a chart including color patches for print color management and a first specific patch which is different from the color patches for print color management, wherein color values are specified as colors of the color patches for print color management in the print data, and a color name is specified as a color of the first specific patch in the print data based on the first table, the color name corresponding to the specific print color which is assigned to a designated image forming apparatus from among the plurality of image forming apparatuses which is designated as a target of print color management;
   cause the designated image forming apparatus to print a chart based on the created print data;
   obtain measured color data given by measuring, with the color measurement device, a chart printed by one of the plurality of image forming apparatuses, and judge, based on the measured color data and based on the first table stored in the memory, whether the chart measured with the color measurement device is the chart printed by the designated image forming apparatus and is usable for print color management of the designated image forming apparatus; and
   perform the print color management on the designated image forming apparatus, if the processor judges that the chart is printed by the designated image forming apparatus and is usable for print color management of the designated image forming apparatus, wherein the processor does not perform the print color management on the designated image forming apparatus, if the processor judges that the chart measured with the color measurement device is not usable for print color management of the designated image forming apparatus.

2. The print color managing apparatus of claim 1, wherein the processor is configured to:
   associate identification information of each of the plurality of image forming apparatuses, color values of a spot color assigned, respectively, to the each of plurality of image forming apparatuses, and a name of the spot color with each other, to create the first table, specify the name of the spot color assigned to the designated image forming apparatus as the color of the first specific patch in the print data, analyze the measured color data to obtain measured color values of the first specific patch of the chart printed by one of the plurality of image forming apparatuses, and if the processor determines, by using the first table, that the measured color values of the first specific patch are not associated with the designated image forming apparatus, judge that the chart measured with the color measurement device is not usable for the print color management of the designated image forming apparatus.

3. The print color managing apparatus of claim 2, wherein the processor is further configured to:

create a second table in which figures to express a date and color values of corresponding print colors are associated with each other, create the print data of the chart to further include second specific patches which are different from the color patches for print color management, and specify color values corresponding to figures expressing a date of instructing one of the plurality of image forming apparatuses to print the chart, as colors of the second specific patches in the print data, analyze the measured color data to obtain measured color values of the second specific patches, determine a date expressed by the figures associated with the measured color values of the second specific patches, by using the second table, and if the processor determines that a difference between the date determined and a current date exceeds a predetermined threshold, judge that the chart measured with the color measurement device is not usable for the print color management of the designated image forming apparatus.

4. The print color managing apparatus of claim 3, wherein the processor manages the first table and the second table as a group of information.

5. The print color managing apparatus of claim 2, further comprising a display, wherein the processor is configured to control the display to display an error message if the processor judges that the chart measured with the color measurement device is not usable for the print color management of the designated image forming apparatus.

6. The print color managing apparatus of claim 1, wherein the processor is further configured to perform control to output an error notification, without performing the print color management on the designated image forming apparatus, if the processor judges that the chart measured with the color measurement device is not usable for print color management of the designated image forming apparatus.

7. A method of chart utilization control in a system including a plurality of image forming apparatuses, a color measurement device and a print color managing apparatus, the plurality of image forming apparatuses each including a color converter which accepts a color name specified as a print color, the method comprising:

creating, by the print color managing apparatus, a first table in which identification information of each of the plurality of image forming apparatuses and a specific print color assigned to the each of the plurality of image forming apparatuses are associated with each other, wherein the specific print colors which are respectively assigned to the plurality of image forming apparatuses are different from one another;

storing, by the print color managing apparatus, the created first table in a memory;

causing, by the print color managing apparatus, each of the plurality of image forming apparatuses to register the specific print color assigned thereto, based on the first table;

creating, by the print color managing apparatus, print data of a chart including color patches for print color management and a first specific patch which is different from the color patches for print color management, wherein color values are specified as colors of the color patches for print color management in the print data, and a color name is specified as a color of the first specific patch in the print data based on the first table, the color name corresponding to the specific print color which is assigned to a designated image forming apparatus from among the plurality of image forming apparatuses which is designated as a target of print color management;

causing, by the print color managing apparatus, the designated image forming apparatus to print a chart based on the created print data;

printing the chart by the designated image forming apparatus based on the created print data;

measuring colors of a chart printed by the one of the plurality of image forming apparatuses, with the color measurement device;

obtaining, by the print color managing apparatus, measured color data of the chart from the color measurement device, and judging, by the print color managing apparatus, based on the measured color data and based on the first table stored in the memory, whether the chart measured with the color measurement device is the chart printed by the designated image forming apparatus and is usable for print color management of the designated image forming apparatus; and performing, by the print color managing apparatus, the print color management on the designated image forming apparatus, if the print color managing apparatus judges that the chart is printed by the designated image forming apparatus and is usable for print color management of the designated image forming apparatus, wherein the print color managing apparatus does not perform the print color management on the designated image forming apparatus, if the print color managing apparatus judges that the chart measured with the color measurement device is not usable for print color management of the designated image forming apparatus.

8. The method of claim 7, wherein:

the creating the first table includes associating identification information of each of the plurality of image forming apparatuses, color values of a spot color assigned, respectively, to the each of plurality of image forming apparatuses, and a name of the spot color with each other, to create the first table, the creating the print data of the chart includes specifying the name of the spot color assigned to the designated image forming apparatus as the color of the first specific patch in the print data, and the judging includes:

analyzing the measured color data to obtain measured color values of the first specific patch of the chart printed by one of the plurality of image forming apparatuses, and if it is determined by using the first table that the measured color values of the first specific patch are not associated with the designated image forming apparatus, judging that the chart measured with the color measurement device is not usable for the print color management of the designated image forming apparatus.

9. The method of claim 8, further comprising:
creating, by the print color managing apparatus, a second table in which figures to express a date and color values of corresponding print colors are associated with each other,
wherein the creating the print data of the chart includes:
creating the print data of the chart to further include second specific patches which are different from the color patches for print color management, and
specifying color values corresponding to figures expressing a date of instructing one of the plurality of image forming apparatuses to print the chart, as colors of the second specific patches in the print data, and
the judging includes:
analyzing the measured color data to obtain the measured color values of the second specific patches,
determining a date expressed by the figures associated with the measured color values of the second specific patches, by using the second table, and
if it is determined that a difference between the date determined and a current date exceeds a predetermined threshold, judging that the chart measured with the color measurement device is not usable for the print color management of the designated image forming apparatus.

10. The method of claim 9, further comprising managing the first table and the second table as a group of information.

11. The method of claim 8, further comprising controlling a display of the print color managing apparatus to display an error message if it is judged that the chart measured with the color measurement device is not usable for the print color management of the designated image forming apparatus.

12. The method of claim 7, further comprising performing control, by the print color managing apparatus, to output an error notification, without performing the print color management on the designated image forming apparatus, if the print color managing apparatus judges that the chart measured with the color measurement device is not usable for print color management of the designated image forming apparatus.

13. A non-transitory computer-readable storage medium storing a chart utilization control program to be executed in a print color managing apparatus which is communicably connected to a plurality of image forming apparatuses and a color measurement device, the plurality of image forming apparatuses each including a color converter which accepts a color name specified as a print color, the chart utilization control program, when being executed by a processor of the print color managing apparatus, causing the print color managing apparatus to perform processing comprising:
creating a first table in which identification information of each of the plurality of image forming apparatuses and a specific print color assigned to the each of the plurality of image forming apparatuses are associated with each other, wherein the specific print colors which are respectively assigned to the plurality of image forming apparatuses are different from one another;
storing the created first table in a memory of the print color managing apparatus;
causing each of the plurality of image forming apparatuses to register the specific print color assigned thereto, based on the first table;
creating print data of a chart including color patches for print color management and a first specific patch which is different from the color patches for print color management, wherein color values are specified as colors of the color patches for print color management in the print data, and a color name is specified as a color of the first specific patch in the print data based on the first table, the color name corresponding to the specific print color which is assigned to a designated image forming apparatus from among the plurality of image forming apparatuses which is designated as a target of print color management;
causing the designated image forming apparatus to print a chart based on the created print data;
obtaining measured color data given by measuring, with the color measurement device, a chart printed by one of the plurality of image forming apparatuses;
judging, based on the measured color data and based on the first table stored in the memory, whether the chart measured with the color measurement device is the chart printed by the designated image forming apparatus and is usable for print color management of the designated image forming apparatus; and
performing the print color management on the designated image forming apparatus, if it is judged that the chart is printed by the designated image forming apparatus and is usable for print color management of the designated image forming apparatus, wherein the print color managing apparatus does not perform the print color management on the designated image forming apparatus, if it is judged that the chart measured with the color measurement device is not usable for print color management of the designated image forming apparatus.

14. The non-transitory computer-readable storage medium of claim 13, wherein:
the creating the first table includes associating identification information of each of the plurality of image forming apparatuses, color values of a spot color assigned, respectively, to the each of plurality of image forming apparatuses, and a name of the spot color with each other, to create the first table,
the creating the print data of the chart includes specifying the name of the spot color assigned to the designated image forming apparatus as the color of the first specific patch in the print data, and
the judging includes:
analyzing the measured color data to obtain measured color values of the first specific patch of the chart printed by one of the plurality of image forming apparatuses, and
if it is determined, by using the first table, that the measured color values of the first specific patch are not associated with the designated image forming apparatus, judging that the chart measured with the color measurement device is not usable for the print color management of the designated image forming apparatus.

15. The non-transitory computer-readable storage medium of claim 14, wherein:
the processing further comprises creating a second table in which figures to express a date and color values of corresponding print colors are associated with each other, the creating the print data of the chart includes:
  creating the print data of the chart to further include second specific patches which are different from the color patches for print color management, and
  specifying color values corresponding to figures expressing a date of instructing one of the plurality of image forming apparatuses to print the chart, as colors of the second specific patches in the print data, and
the judging includes:
  analyzing the measured color data to obtain the measured color values of the second specific patches,
  determining a date expressed by the figures associated with the measured color values of the second specific patches, by using the second table, and
  if it is determined that a difference between the date determined and a current date exceeds a predetermined threshold, judging that the chart measured with the color measurement device is not usable for the print color management of the designated image forming apparatus.

16. The non-transitory computer-readable storage medium of claim 15, wherein the processing further comprises managing the first table and the second table as a group of information.

17. The non-transitory computer-readable storage medium of claim 14, wherein the processing further comprises controlling a display of the print color managing apparatus to display an error message if it is judged that the chart measured with the color measurement device is not usable for the print color management of the designated image forming apparatus.

18. The non-transitory computer-readable storage medium of claim 13, wherein the processing further comprises performing control to output an error notification, without performing the print color management on the designated image forming apparatus, if it is judged that the chart measured with the color measurement device is not usable for print color management of the designated image forming apparatus.

* * * * *